United States Patent [19]
Wittenbrink et al.

[11] Patent Number: 6,077,419
[45] Date of Patent: *Jun. 20, 2000

[54] PILLARED CLAY CATALYSTS FOR HYDROCONVERSION

[75] Inventors: Robert J. Wittenbrink, Baton Rouge, La.; Jack W. Johnson, Clinton, N.J.

[73] Assignee: Exxon Research and Engineering Company, Florham Park, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/924,361

[22] Filed: Sep. 6, 1997

Related U.S. Application Data

[63] Continuation-in-part of application No. 08/655,263, Jun. 4, 1996, abandoned.

[51] Int. Cl.[7] .......................... C10G 47/02; C10G 25/00; C10G 35/06
[52] U.S. Cl. ............................... 208/112; 208/27; 208/138
[58] Field of Search ............................... 208/112, 27, 138

[56] References Cited

U.S. PATENT DOCUMENTS 4,995,964 2/1991 Gortsema et al. ...................... 208/112

FOREIGN PATENT DOCUMENTS

| | | | |
|---|---|---|---|
| 0508005 | 10/1992 | European Pat. Off. | C10G 47/20 |
| 0753563 | 1/1997 | European Pat. Off. | C10G 45/66 |
| 0811671 | 12/1998 | European Pat. Off. | C10G 45/64 |
| 96/07477 | 3/1996 | WIPO . | |
| 9607477 | 3/1996 | WIPO | B01J 21/16 |

OTHER PUBLICATIONS

Parulekar, V.N. and Hightower, J.W.; Hydroisomerization of n–Paraffins on a Platinum–Thenium/Pillared Clay Mineral Catalyst, Applied Catalysis, 35 (1987) 249–292.

*Primary Examiner*—Gary Geist
*Assistant Examiner*—J. Parsa
*Attorney, Agent, or Firm*—Jay Simon; Johnathan N. Provoost

[57] ABSTRACT

Pillared clays composited with Group VIII metals or Group VI metals may be used for the hydroconversion with excellent activity maintenance, of Fischer Tropsch waxes, boiling above about 700° F.

10 Claims, 1 Drawing Sheet

PILLARED CLAY CATALYSTS FOR HYDROCONVERSION

CROSS REFERENCE

This application is a Continuation-in-Part of U.S. Ser. No. 8,655,263, filed Jun. 4, 1996, now abandoned.

FIELD OF THE INVENTION

This invention relates to the preparation of distillate materials useful as fuels. More particularly, this invention relates to the preparation of distillate hydrocarbons via the hydroconversion of waxy materials using a pillared clay catalyst.

BACKGROUND OF THE INVENTION

Waxy materials such as slack waxes and waxes prepared from hydrocarbon synthesis processes, e.g., the Fischer-Tropsch process, can be upgraded to valuable materials, such as distillate transportation fuels, by hydroconversion processes including hydrocracking coupled with isomerization. The need exists for catalyst with satisfactory conversion and high selectivity to the desired distillate product.

Recent publications regarding the use of pillared clays as supports for hydroconversion processes have been of two minds: pillared clays with a noble metal component are likened to standard noble metal loaded large pore zeolite hydrocracking catalysts where cracking is excessive and selectivity is less than desirable at high conversions, see Doblin, C. et al., Applied Catalysis, 70 (1991) 197–212; while in a separate publication, other authors concluded that insufficient acidity existed in Al-pillared montmorillonites for achieving bifunctional properties, i.e., Molina, R. et al., J. Catal. 148, 304–314 (1994).

This invention, however, provides a pillared clay catalyst of excellent selectivity to desired distillates.

SUMMARY OF THE INVENTION

In accordance with this invention Fischer-Tropsch waxes, i.e., materials at least 70% of which boil over 700° F., can be converted to desirable distillate products by treatment with a pillared clay supported metal catalyst through a mild hydrocracking/hydroisomerization process. The catalyst is comprised of Group VIII, Group VI or Group IB metals in the substantial absence of rare earth metals, and the catalyst shows excellent activity maintenance.

Pillared clays are well known in the literature, and their use as hydroconversion catalysts has been reported. See, for example, "Catalysis Today," vol. 2, 2–3 (1988); Pillared Clays, ed. by R. Burch. Nevertheless, the selectivity to desired distillate products where waxy feeds are treated is surprising and unexpected from published literature. Not only are these catalysts highly active for hydroconversion of waxy feeds, the degree of cracking, i.e., gas and naphtha make, is surprisingly lower than would be expected. Thus, the Doblin et al paper, op. cit., disclosed the use of a platinum supported pillared clay for the hydroconversion of octane. Significant cracking was observed. Cracking will be expected to be more severe with waxy feeds, which are more susceptible to cracking than octane: Nevertheless, gas and naphtha make are significantly reduced when waxy feeds are subjected to hydroconversion with the pillared clays described herein, as compared to the use of standard noble metal loaded large pore zeolite hydrocracking catalyst.

PREFERRED EMBODIMENTS

Figure 1:
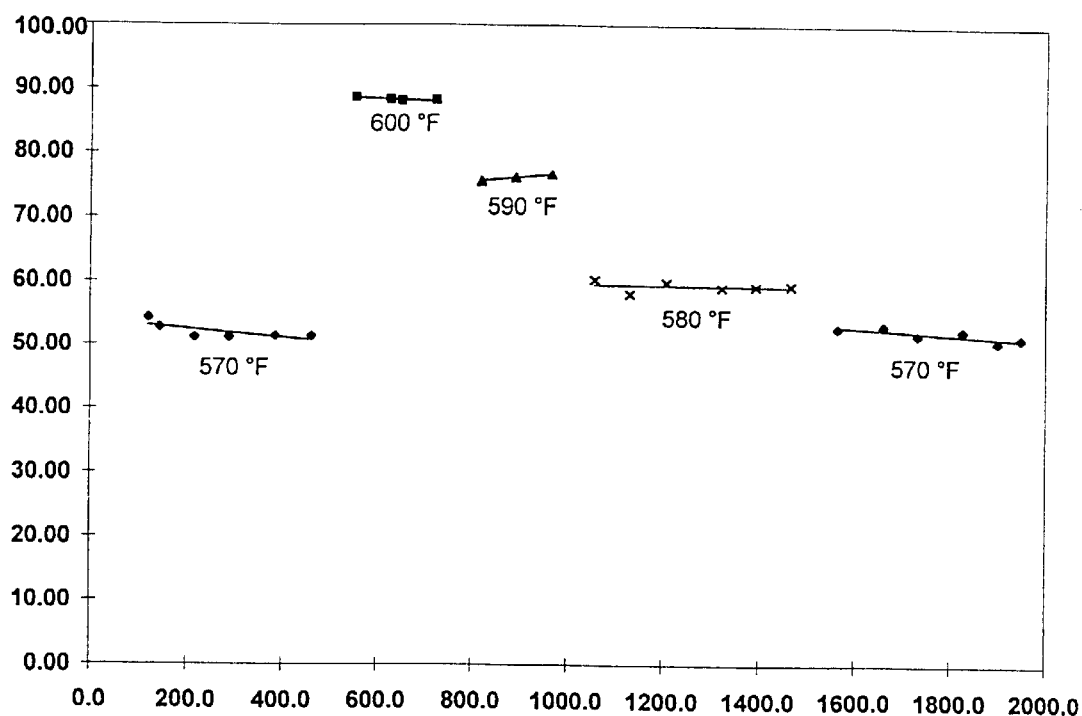
FIG. 1 depicts a plot of activity expressed 700° F.+ conversion (ordinate) versus time (hours on feed, abscissa). Fischer-Tropsch feed containing 78.8% 700° F.+ and 21.2% 700° F.− was introduced to a 0.5 wt % Pd on zirconia pillared bentonite clay catalyst at 570° F., after a brief line-out period, the catalyst stabilized at about 52% conversion. Temperature was then varied to obtain several different conversion levels, after which temperature was returned to 570° F. and conversion was essentially identical to that at start-of-run. The catalyst showed no measurable deactivation after more than 80 days on stream thereby exhibiting excellent activity maintenance.

Clays useful in preparing pillared clays are swellable clays and may be either naturally occurring or synthetic. Examples of clays that are naturally occurring are: montmorillonite, bentonite, beidellite, nontronite, saponite, and hectorite; and examples of synthetic clays are: fluorohectorite and fluoromicas such as sodium tetrasilicic mica (NaTSM) and synthetic taeniolite.

Pillaring agents, which essentially increase the spacing between the dense clay layers, are generally known and are composed of metal oxides or metal oxide precursors such as alumina, silica, silica-alumina, zirconia, titania and gallium oxide, alone or in combination, preferably zirconia and alumina, more preferably zirconia. After pillaring, the spacing between the layers is known as the gallery height and is generally in the range of about 5–15 Å for pillared clays of this invention. The gallery height is calculated by subtracting the thickness of a clay layer, ~9.6 Å, from the layer repeat distance measured by powder X-ray diffraction.

Suitable clays useful in this invention are smectites, vermiculites, and micas that may be visualized as a sandwich comprising two outer sheets of silicon tetrahedra and an inner layer of aluminum octahedra (i.e., a 2:1 layered clay). These clays are generally represented by the formula:

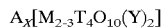

where M is the octahedral cation, T is the tetrahedral cation, A is the exchangeable interlayer cations, $0 \leq x \leq 1$, and Y is hydroxyl (OH) or fluorine (F) either alone or in combination. The octahedral cations (M) are most commonly cations from the group comprising Al, Mg, Fe, Li; and the tetrahedral cations (T) are most commonly from the group comprising Si, Al, or Fe, either alone or in combination.

A preferred pillared clay and its preparation is described in U.S. Pat. No. 5,248,644 incorporated herein by reference.

In general, however, pillared clay catalysts may be prepared by the following procedure:

The pillared clay or support function of the catalyst is typically prepared by contacting a swellable clay with a solution containing the pillar precursor. Clays that undergo swelling when dispersed in water or another polar solvent are suitable for use in preparing pillared clays. Typical examples of such clays are natural or synthetic clays of the smectite class such as bentonite, montmorillonite, beidellite, saponite, hectorite, and nontronite; vermiculites; and fluoromicas such as taeniolite and sodium tetrasilicic mica. Suitable pillar precursors are compounds of metallic elements such as aluminum, zirconium, silicon, gallium, iron, chromium and the like that form oligimeric species that replace the exchangeable cations between the clay layers when the solution of pillar precursor is contacted with the swellable clay, and furthermore form suitable oxide pillars upon calcination that prop the clay layers apart to create microporous galleries with gallery heights preferably in the range of about 6–14 Å.

Metal functionality for the catalyst can be supplied by metals from Group VIII, noble or non-noble, Group VI, e.g. molybdenum, chromium or tungsten, or Group 1B, e.g. copper. Preferred metals are Group VIII metals, particularly the noble metals, most particularly platinum or palladium. Combinations of metals may also be used, for example, Pt/Pd, Ni/W, Co/Mo, Cu/Co/Mo. The amount of metal is present in sufficient quantities to provide hydroconversion activity and may range from about 0.1 wt % to about 20 wt %, depending on the particular metal.

Characteristics of the expanded pillared clay catalyst include surface areas of at least about 100 $m^2$/gm, preferably 100–400 $m^2$/gm, more preferably 250–400 $m^2$/gm; micropore volumes of at least about 0.05 ml/gm, preferably 0.05–2.0 ml/gm, more preferably 0.08–1.5 ml/gm.

The dehydrogenation or metal function of the catalyst is added by treating the pillared clay with a suitable metal compound by standard impregnation, ion-exchange, vapor deposition, or other suitable techniques. Metals from Group VIII, VI, and IB can be used individually or in conjunction with one another. Specific examples include Group Vil metals such as Ni, Co, Fe, Pt, Pd, Os, Ru, Ir, and Rh, Group VI metals such as Cr, Mo, and W, and Group IB metals such as Cu. Examples of combinations of these metals that may be used include Pt/Pd, Ni/W, Co/Mo, and Cu/Co/Mo. Preferred are the Group VIII noble metals Pd and Pt.

The pillared clay of this invention has the metal functionality mentioned above and is distinguished from prior art materials in that the pillared clay contains substantially no rare earth materials, that is, the catalyst contains Group VIII metals, Group VI metals or Group IB metals or their mixtures, in the substantial absence of rare earth metals, e.g., no more than trace amounts, and the clay is preferably prepared in the absence of rare earth metal containing compounds. In essence, rare earths play no part in determining the activity of the catalyst or selectivity to the products.

Waxy feeds useful in this invention are preferably slack waxes and more preferably Fischer-Tropsch waxes (preferably from a non-shifting Fischer-Tropsch catalyst), and at least a portion of the feed boils above about 700° F. While 700° F.+ feeds are preferred, some 700° F.− material may be in the feed and is substantially unaffected by the hydroconversion process. The feed can contain up to about 30% 700° F.− preferably about 1–25% 700° F.−. Thus, larger molecules preferentially adsorb in the catalyst and 700° F.− materials, in the presence of 700° F.+ materials, undergo very little hydroconversion. Thus, hydroconversion is substantially limited to 700° F+ material. The feed is preferably primarily 700° F.+, more preferably at least about 70% 700° F.+.

Fischer-Tropsch feeds preferably contain nil sulfur, nitrogen, and aromatics, that is, less than 50 ppm S, less than 50 ppm N, and less than about 1 wt % aromatics and other unsaturates. The very low levels of sulfur, nitrogen, and aromatics allows the catalyst to maintain its activity for long periods of time. Thus, unlike catalysts over which conventional petroleum is hydroconverted and catalyst activity decreases with time necessitating regular temperature increases to maintain conversion, the catalyst of this invention with Fischer-Tropsch feeds, shows excellent activity maintenance and is capable of maintaining high levels of conversion, i.e., about 40–60% 700° F.+ conversion, e.g., about 50% 700° F.+ conversion with only a minimal TIR (temperature increase required). Thus, the processing of Fischer-Tropsch feed over the described catalyst can maintain catalytic activity such that the TIR for a defined level of conversion, as described above, e.g. 50%, is no more than 25° F., preferably no more than 20° F., more preferably no more than 10° F., and still more preferably no more than 5° F. The TIR is determined at lined out conditions which are a function of reactor size, space velocity, etc. Thus, in the hydroconversion process of this invention, there is an initial burst of activity after which a steady state conversion achieved. It is at these lined out conditions, which are well known and easily determined by those skilled in the art, that the TIR is applicable.

The hydroconversion process is well known in the art and can be effected in the presence of hydrogen over a broad range of elevated temperatures and pressures. For example, temperatures may range from 450 to 750° F., preferably 500 to 700° F., more preferably 550 to 650° F.; while pressures may range from 15–100 atmospheres, preferably 30–70 atmospheres.

Similarly, hydrogen treat rates may vary widely, e.g., 500 to 10,000 SCF/B feed, preferably 1000 to 5000 SCF/B feed. Space velocity may range from 0.5–5 LHSV, preferably from 0.5–2.

The hydroconversion is generally carried out at conversions of about 20–80% based on 700° F.+ feed. However, there exists a selectivity-conversion trade off. That is, as conversion is increased, selectivity to desired products decreases. Consequently, conversion preferably ranges from about 30–70%, more preferably 40–60% based on 700° F.+ feed.

After treatment of the feed with the PILC catalyst, desirable distillate product can be recovered, e.g. by distillation. This product generally boils in the range 250–700° F., and meets required specifications for diesel fuels, i.e., flash point, cloud point, pour point and high cetane number. While the cetane specification is a minimum of 40, the distillate material produced by this process has a cetane number of at least 60, preferably at least 65.

The following examples will serve to illustrate but not limit this invention.

EXAMPLE 1

Preparation of Zr-Bentonite

A pillared clay catalyst (PILC) was prepared from a commercially available montmorillonite clay with zirconyl acetate solution as the pillaring agent using procedures similar to that described in U.S. Pat. No. 5,248,644. 500 ml zirconyl acetate solution from Magnesium Elektron (ZAA, 22% ZrO$_2$) was diluted with 2.8 L distilled H$_2$O and 50.00 g bentonite from American Colloid (Volclay HPM-20) was added. The dispersion was stirred vigorously at room temperature for 3 hr and the solid was isolated via centrifugation and washed with eight 4 L portions of H$_2$. The solid product was heated in a fan oven at 120° C. for 48 hr. The temperature was then increased at 100° C./hr to 200° C., held for 2 hr, increased at 100° C./hr to 400° C. and held for 2 hr. The yield of Zr-bentonite was 67.3 g, with a layer spacing measured by XRD of 20.5 Å, a BET surface area of 372 m$^2$/g, and a micropore volume of 0.138 ml/g. Elemental analysis via ICP-AES showed 19.5% Zr, 19.2% Si, 7.25% Al, 1.6% Fe, 0.90% Mg, and 0.07% Na.

EXAMPLE 2

Catalysts were evaluated for 700° F.+ wax conversion activity, selectivity, and product quality under several different sets of processing conditions. The screening was carried out in a small up-flow pilot plant. The catalysts were evaluated at 750 psig H$_2$, 0.50 LHSV, and with a hydrogen treat rate of 2500 SCFIB. A 10 mL charge of catalyst crushed and screened to 14/35 mesh (Tyler) was employed in all cases. The unit sandbath was equipped with four 0.375" O.D. reactors. Balances were typically collected at 24–72 hour intervals. The reaction temperature was adjusted to provide various 700° F.+ conversion levels. The feed was a Fischer-Tropsch wax with the following characteristics:

|  | Wt % |
| --- | --- |
| 1–500 | 0.70 |
| 500–700 | 20.48 |
| 700–1050 | 62.48 |
| 1050+ | 16.34 |

Product distributions were determined by both simulated gas chromatography (i.e., GCD) and 15/5 distillation. Typically, composite samples of 2–4 balance periods were used in the 15/5 distillations. Pour point, cloud point, freeze point, and predicted cetane numbers were obtained on appropriate fractions from the 15/5 distillations using standard ASTM methods. Gas samples were collected in gas collection bombs just prior to the end of each balance and analyzed using mass spectroscopy. 700° F.+ conversion was calculated using the following equation:

$$700° \text{ F.+ Conversion} = 1 - \frac{700° \text{ F.+in product}}{700° \text{ F.+in feed}} \times 100$$

A summary of the catalysts investigated is given in Table 1. Catalyst A was a commercially available material containing 0.50 wt % Pd dispersed on a particulate support containing 70% amorphous silica-alumina with 12% alumina and 30% alumina binder. Catalyst B was a commercially available hydrocracking catalyst containing 0.5 wt % Pd dispersed on a particulate support material containing about 80% ultrastable-Y zeolite and 20 wt % alumina. (Catalyst B was thus similar in nature to the comparative catalyst in Doblin, C., et al., op. cit. which acted similarly as Pt/PILC catalyst in the hydroconversion of octane.) Catalyst C was prepared as described in Example 1.

The metals were impregnated with aqueous solutions of tetraaminepalladium chloride (Strem) using standard incipient wetness techniques followed by drying and calcination.

TABLE 1

| Catalyst | Composition | Reaction Temperature ° F. | 700° F. + Conversion |
| --- | --- | --- | --- |
| A | 0.5 wt % Pd on amorphous silica-alumina containing 12% alumina and 30% alumina binder | 600 | 52 |
| B | 0.5 wt % Pd on composite support with 80% ultrastable-Y | 450 | 49 |
| C | 0.5 wt % Pd on zirconia pillared bentonite clay | 570 | 52 |

The different catalysts displayed significant differences in wax conversion activity. The most active is the Y zeolite while the PILC is slightly, but significantly more active than the amorphous silica-alumina. Activity was determined by the temperature required to achieve ~50% conversion of 700° F.+ material in the feed.

Table 2 provides a comparison of the product distributions, jet freeze points, diesel pour points, and cetane ratings for operations carried out at about 50% 700° F.+ conversion.

TABLE 2

| Catalyst | 700° F. + Conv. | Product Yields | | | | 320–500 Freeze Point, ° C. | 500–700 Pour Point, ° C. | 500–700 Cetane |
| --- | --- | --- | --- | --- | --- | --- | --- | --- |
|  |  | C1–C4 | C5–320 | 320–500 | 500–700 |  |  |  |
| A | 52 | 1.50 | 5.29 | 17.61 | 38.30 | −50.6 | −12 | 66 |
| B | 49 | 3.50 | 13.60 | 18.03 | 25.06 | −32.0 | 11 | 71 |
| C | 52 | 1.52 | 5.12 | 17.46 | 38.76 | −38.5 | 3 | 69 |

Catalyst C had better activity than Catalyst A while producing a similar product slate and had less activity than Catalyst B but produced a markedly superior product slate, yielding more distillate fuel and less gas and less naphtha.

Table 3, below, shows a comparison of yields and percent diesel efficiency for Catalyst C at conversions of 52% and at about 59%.

TABLE 3

| Temp, °F. | 700° F.+ Conv. | Product Yields | | | % Diesel Eff. |
|---|---|---|---|---|---|
| | | C1–C4 | C5–320° F. | 320–700° F. | |
| 570 | 52 | 1.52 | 5.12 | 56.22 | 89.4 |
| 580 | 59 | 1.55 | 5.89 | 60.50 | 89.0 |

To further investigate the acidity of these catalysts a series of experiments was carried out investigating the isomerization of 2-methylpent-2-ene (2MP2). The 2MP2 isomerization test was carried out as described in G. M. Kramer and G. B. McVicker, Acc. Chem. Res. 19, 78 ff. (1986). The formation rates and rate ratios of the product hexene isomers of this test reaction reflect the relative concentration and strength of the acid sites in the catalyst, respectively. The product hexene isomers formed include 4-methylpent-2-ene (4MP2), trans-3-methylpent-2-ene (3MP2), and 2,3-dimethylbut-2-ene (2,3-DMB2). Formation of 4MP2 requires only a double bond shift, a reaction that can occur on weak acid sites. Formation of 3MP2 takes place through a methyl group shift, which requires a stronger acid site. Finally, formation of the doubly branched 2,3-DMB product requires even stronger acidity. For a given series of catalysts, differences in 3MP2 rates normalized with respect to surface area reflect the density of acid sites possessing strengths sufficient to catalyze skeletal isomerization. Since skeletal isomerization rates generally increase with increasing acid strength, the ratio of the rate of methyl group migration to the rate of double bond shift should increase with increasing acid strength. The use of rate ratios, in lieu of individual conversion rates, is preferable since the difference in acid site populations are normalized.

Table 4 summarizes rates and product distributions for Catalysts A and C. Surprisingly, these results are contrary to the results obtained from the hydroisomerization of a Fischer-Tropsch wax. For example, the higher activity for wax conversion of the PILC catalysts (Catalyst C) relative to amorphous silica-alumina (Catalyst A) shown in Table 1 seems to indicate that the PILCs are more acidic. However, the 2MP2 isomerization test shows the opposite effect. In fact, Catalyst A contains more of the stronger acid sites as measured by the 2,3DMB2/4MP2 ratio as well as more of the weaker acid sites as measured by the 3MP2/4MP2 ratio.

TABLE 4

| | 2-Methylpent-2-ene Isomerization | | |
|---|---|---|---|
| Catalyst | Conversion, wt % | 3MP2/4MP2 | 2,3DMB2/3MP2 |
| Catalyst A | 67.2 | 1.47 | 0.192 |
| Catalyst C | 51.6 | 0.135 | 0.012 |

The results of the 2MP2 isomerization test corroborate the findings of Molina et al. supra, regarding acidity of pillared montmorillonites but the utility of these materials as catalysts is demonstrated herein.

What is claimed is:

1. A hydroconversion process for waxy Fischer-Tropsch derived feeds containing less than 50 ppm sulfur, less than 50 ppm nitrogen and less than about 1% weight aromatics, at least a portion of which boils above about 700° F.+, which comprises contacting the feed at hydroconversion conditions with a catalyst containing at least one metal selected from the group consisting of Group VIII, Group VI and Group IB metals supported on a pillared clay and in the substantial absence of rare earth containing materials wherein the hydroconverted product has a cetane number of at least 60.

2. The process of claim 1 wherein the TIR at lined out conditions is not more than 25° F. at a given 700° F.+ conversion level after 25 days.

3. The process of claim 1 wherein the TIR at lined out conditions is not more than 20° F. at a given 700° F.+ conversion level after 100 days.

4. The process of claim 2 wherein the metal is a Group VIII noble metal.

5. The process of claim 4 wherein the metal is platinum or palladium.

6. The process of claim 2 wherein a hydroconverted product boiling in the range 250–700° F. is produced.

7. The process of claim 1 wherein the pillared clay has a gallery height of about 5–5 Å.

8. The process of claim 7 wherein the pillared clay is a zirconia-pillared montmorillonite.

9. The process of claim 2 wherein hydroconversion conditions include temperatures ranging from about 500 to 650° F. and pressures ranging from about 15 to 100 atmospheres.

10. The process of claim 1 wherein the conversion of 700° F.+ feed to 700° F.− ranges from about 30–70%.

* * * * *

UNITED STATES PATENT AND TRADEMARK OFFICE
CERTIFICATE OF CORRECTION

PATENT NO.    : 6,077,419
DATED         : June 20, 2000
INVENTOR(S)   : Robert J. Wittenbrink and Jack W. Johnson It is certified that error appears in the above-identified patent and that said Letters Patent is hereby corrected as shown below:

Claim 7,
The range of the gallery height of the pillared clay is printed as "5-5 Å". The correct recitation of the range should read -- 5-15 Å --.

Signed and Sealed this

Sixteenth Day of April, 2002

Attest:

Attesting Officer

JAMES E. ROGAN
Director of the United States Patent and Trademark Office